United States Patent Office 3,143,000
Patented Aug. 4, 1964

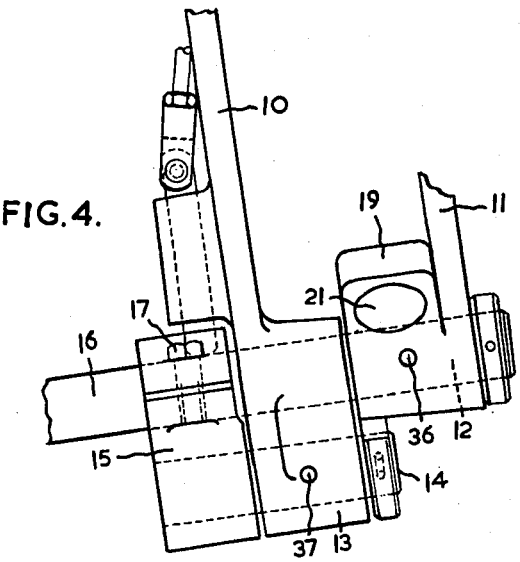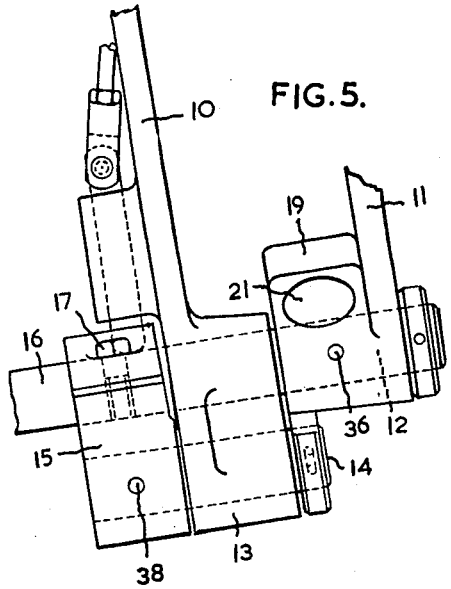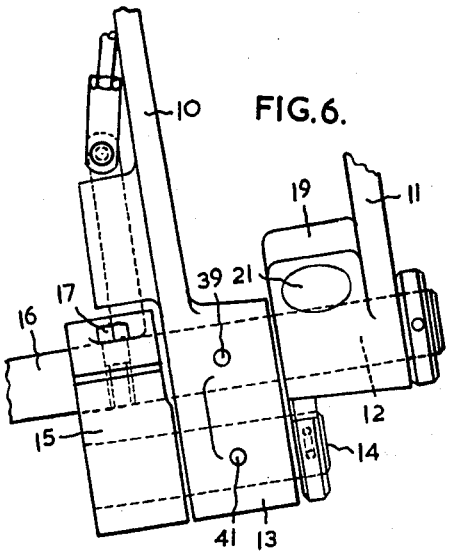

3,143,000
BRAKE SYSTEMS FOR VEHICLES
Alexander John Wilson, Sutton Coldfield, England, assignor to Girling Limited, Birmingham, England, a British company
Filed May 15, 1961, Ser. No. 109,928
Claims priority, application Great Britain May 20, 1960
3 Claims. (Cl. 74—480)

This invention relates to improvements in braking systems for vehicles, and more particularly braking systems for vehicles such as agricultural tractors in which the brakes are used for steering purposes as well as for the normal retardation of the movement of the vehicle.

On such vehicles the usual practice is to employ two independent braking systems, each applying the brake or brakes on one side of the vehicle for steering purposes. The brakes are applied by separate pedals or levers which can be locked together by means actuated by the driver when all the brakes are to be applied simultaneously for normal retardation of the vehicle.

In braking systems of this kind, it is a matter of difficulty to provide for compensation of the brakes on the two sides of the vehicle when all the brakes are applied in normal travelling and at the same time to provide for independent operation of the brakes on one side or the other of the vehicle for steering purposes.

Compensation is necessary when the brakes are applied simultaneously to allow for unequal wear of the braking surfaces, and to allow for unequal deflection of the transmission between the pedals and the brakes under load. For example, where the brakes on one side of the vehicle are applied substantially directly by one pedal and the brakes on the other side are applied by the other pedal through a cross shaft of substantial length, unequal braking can be obtained when the pedals are interlocked owing to torsional deflection of the cross shaft under load.

According to our invention, in a braking system incorporating brakes on opposite sides of a vehicle applied by separate pedals which can be locked together by means actuated by the driver when all the brakes are to be applied simultaneously, the brakes on one side of the vehicle are applied directly by one pedal, and the brakes on the other side are applied through mechanical compensating mechanism which is controlled by the pedal locking means and is inoperative when the pedals are free and operative when they are locked together.

In a preferred arrangement the locking means is a member pivoted in one pedal and adapted to engage in a slot or groove in the other pedal, and this member controls through a rod or link a plunger which locks or releases the compensating mechanism.

One embodiment of our invention is illustrated by way of example in the accompanying drawings in which:

FIGURE 4 is a fragmentary view of the pedal compensating mechanism showing a minor modification;

FIGURE 5 is a fragmentary view of the pedal compensating mechanism showing a further minor modification; and FIGURE 6 is a fragmentary view of the pedal compensating mechanism showing yet a further minor modification.

Figure 1:
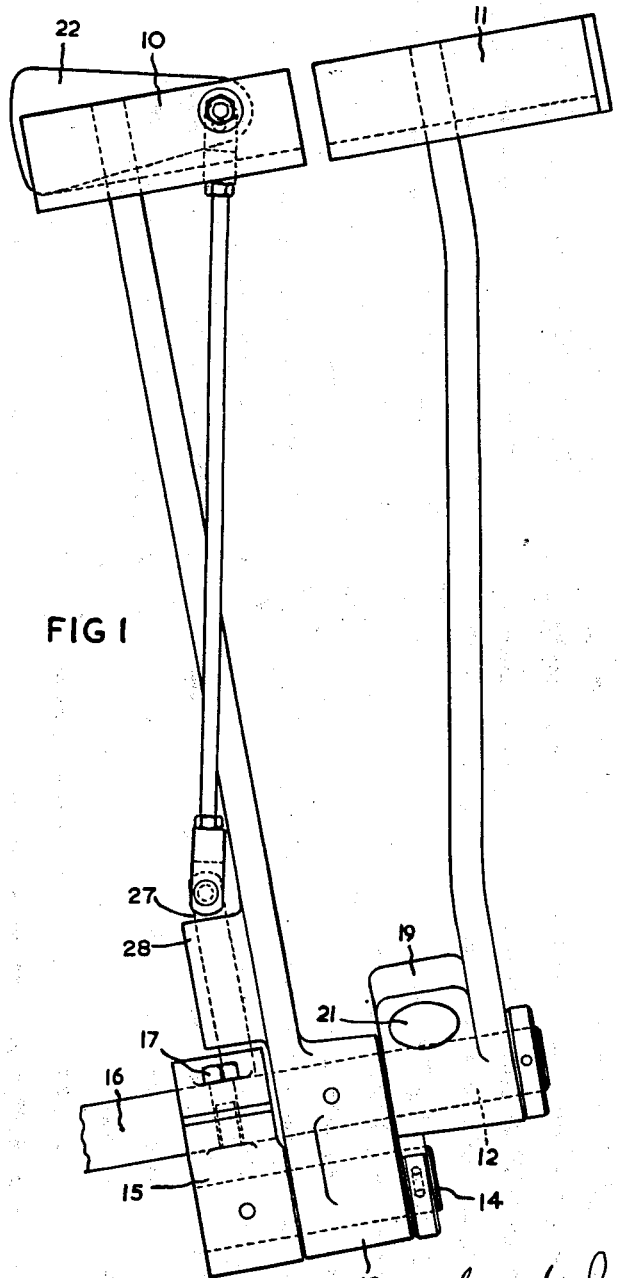
FIGURE 1 is a front elevation of two brake-operating pedals incorporating compensating mechanism in accordance with our invention.
Figure 2:
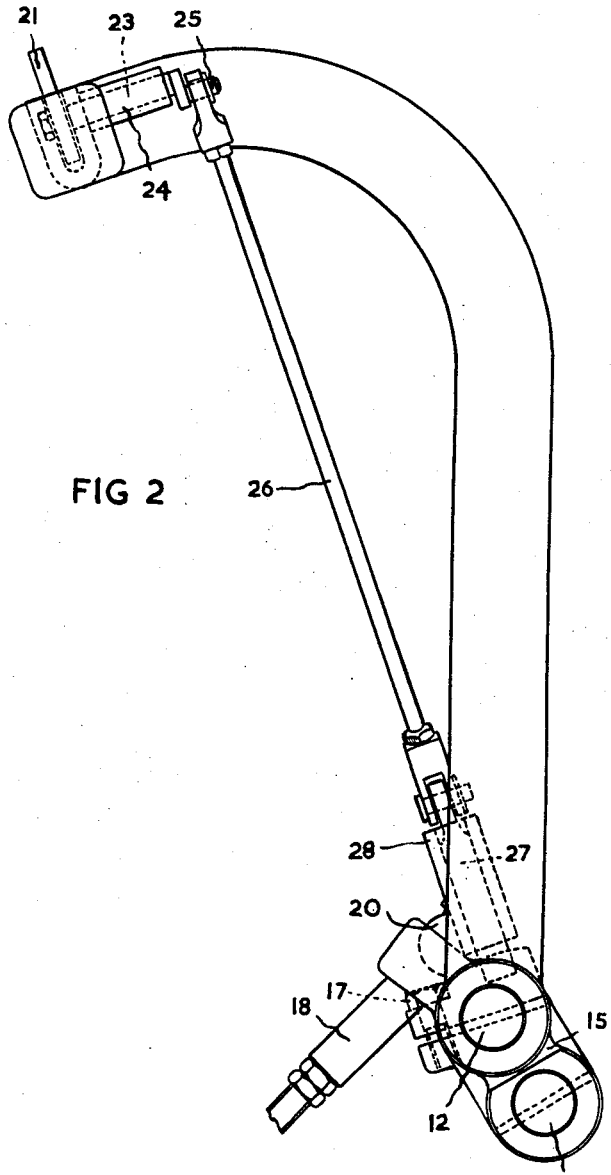
FIGURE 2 is a side elevation of the assembly shown in FIGURE 1.
Figure 3:
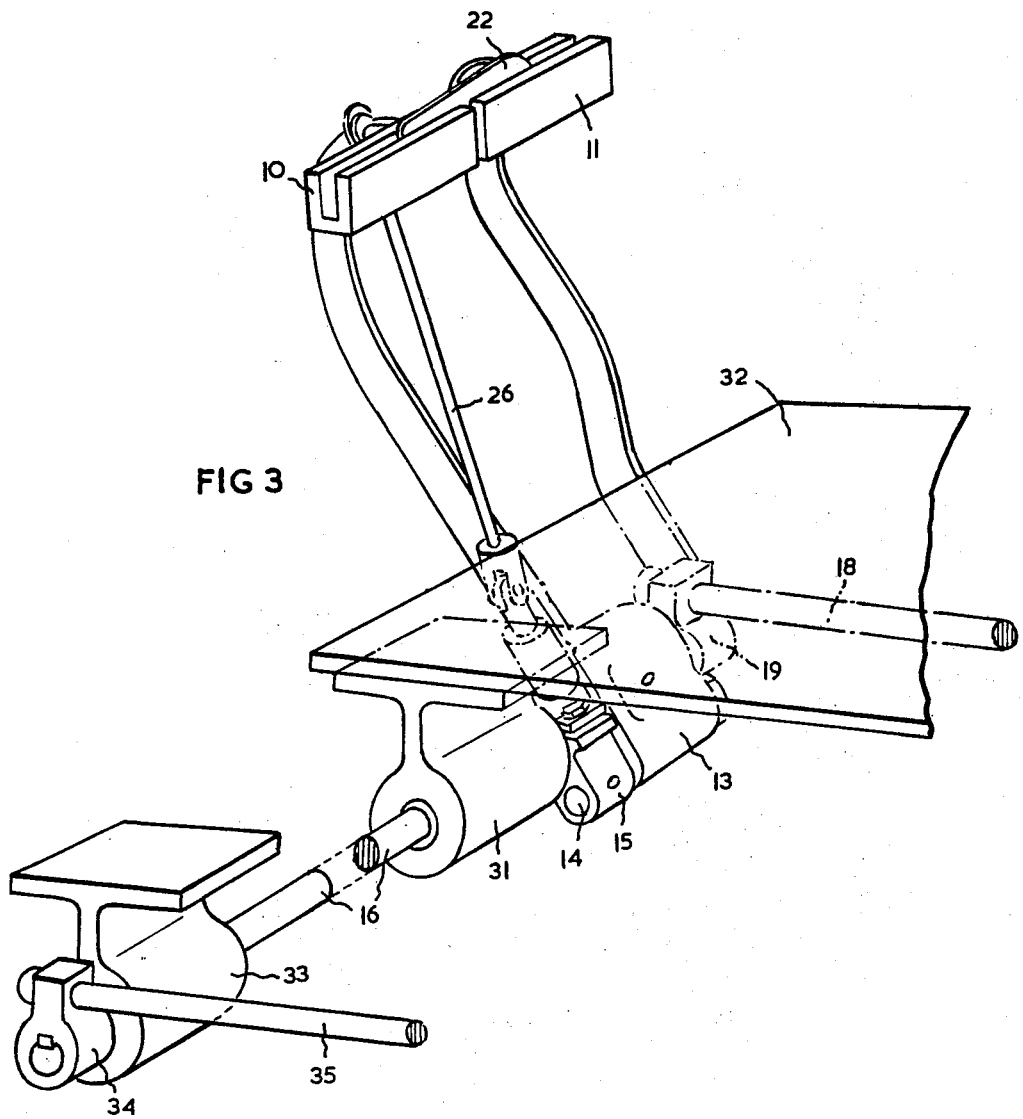
FIGURE 3 is a perspective view showing the mounting of pedals and associated brake operating rods in a vehicle.

In the drawings, 10 and 11 are two pedals for applying brakes on opposite sides of a vehicle, the two pedals being arranged side by side for either independent or simultaneous operation. At its lower end the pedal 11 is mounted for angular movement about a shaft 12 which is received in a bore in the lower end of the pedal 10 to which the shaft is keyed or pinned.

The pedal 10 is extended downwardly below the shaft 12 in the form of a boss 13 which is bored to receive a short shaft 14 of which the axis is parallel to that of the shaft 12. The shaft 14 is rotatably mounted in the bore in the boss 13 and carries an upwardly extending arm 15 which is keyed or pinned to it. A cross shaft 16 for operating the brakes on the side of the vehicle remote from the pedals is clamped in a bore in the upper end of the arm 15 which is split and is provided with a clamping bolt 17.

In the off position of the brakes, the axis of the cross shaft 16 is substantially in alignment with the axis of the shaft 12 as shown in the drawings.

The pedal assembly is carried by the shaft 16 which is rotatably mounted adjacent to the assembly in a long bearing in a bracket 31 secured to a floor plate 32 or other stationary part of the vehicle. The shaft 16 extends transversely across the vehicle and adjacent to its other end is supported in an outrigger bearing in a bracket 33 secured to a convenient part of the vehicle. On the outer side of the bracket an arm 34 is fixed on the shaft and has coupled to it a rod 35 for operating the brakes on this side of the vehicle.

The brakes on the side of the vehicle adjacent to the pedals are operated by a pull-rod 18 passing through an offset lug 19 on the lower end of the pedal 11, the pull-rod having a part-spherical head 20 which is received in a complementary seating 21 in the lug.

The pedals are adapted to be locked together for simultaneous operation by a spade-shaped member 22 pivotally mounted in the pedal 10 and adapted to be swung over to engage in a slot or groove in the other pedal. The member 22 is keyed on a spindle 23 rotatably mounted in a boss 24 on the pedal 10, and on one end of the spindle there is an eccentric pin 25 to which is pivotally connected one end of a rod 26. The other end of the rod is pivotally connected to a locking plunger 27 which is axially movable in a lug 28 on the pedal 10 and is adapted to engage in a recess in the upper end of the arm 15, the axis of the plunger being radial with respect to the shaft 12.

When the member 22 is in the free position shown in the drawings, the plunger is in locking engagement with the recess in the arm 15 so that the pedal 10 is rigidly connected to the arm which must move angularly with the pedal, and on depression of the pedal the cross shaft 16 moves angularly with the shaft 12 to apply the brakes on one side of the vehicle. The brakes on the other side are applied by depression of the pedal 11 which is free to rotate on the shaft 12, the operation of the two brakes or sets of brakes being completely independent.

When the member 22 is swung over to lock the two pedals together for simultaneous operation of both brakes, the angular movement of the spindle 23 on which the member is keyed withdraws the locking plunger 27 from engagement with the arm 15.

When the pedals are depressed to apply the brakes, both pedals can move angularly about the axis of the short shaft 14, the shaft 12 moving out of alignment with the cross shaft 16. This movement continues until any clearances between the pedal 11 and the brakes actuated by it have been taken up. The pedals then tend to move angularly about the centre of the seating 21 for the head on the rod 18 and cause bodily movement of the shaft 14 which, through the arm 15, moves the cross-shaft 16 angularly to take up any clearances in the other brakes. Continued depression of the pedals then applies both brakes or sets of brakes with equal pressure.

From the above description it will be obvious that when the brake pedals are locked together, the system is automatically compensated for any differences in wear between the braking surfaces on the two sides of the vehicle and any differences in deflection in the transmission members under load.

In the modification shown in FIG. 4, the pedal 10 is free to rotate on the shaft 12 which is keyed in the pedal 11 by a pin 36, and the arm 15 is free to rotate on the shaft 14 which is keyed in the boss 13 by a pin 37.

In the modification shown in FIG. 5, the pedal 10 is free to rotate on the shaft 12 which is keyed in the pedal 11 by a pin 36 as in FIG. 4, but the shaft 14 is keyed in the arm 15 by a pin 38 and is free to rotate in the boss 13 as in FIG. 1.

In the modification shown in FIG. 6, the shaft 12 is keyed in the pedal 10 by a pin 39 and the pedal 11 is free to rotate on the shaft while the arm 15 is free to rotate on the shaft 14 which is keyed in the boss 13 by a pin 41.

These modifications are simply different ways of providing relative angular movement between the members of the compensating mechanism and do not affect the way in which the mechanism functions.

I claim:

1. Means for applying separately and simultaneously brakes on opposite sides of a vehicle comprising two pedals mounted side-by-side for angular movement about a common axis, drive-operated means for locking the pedals together for simultaneous operation, means coupling one pedal directly to the brakes on one side of the vehicle, means including compensating mechanism coupling the other pedal to the brakes on the other side of the vehicle, and means controlled by said pedal locking mechanism for rendering said compensating mechanism operative when the pedals are locked together.

2. Means for applying separately and simultaneously brakes on opposite sides of a vehicle comprising first and second pedals mounted side-by-side, one of said pedals being angularly movable about a first shaft fixed in the other of said pedals, means coupling said first pedal to the brakes on one side of the vehicle, an extension of said second pedal beyond the first shaft, a second shaft mounted in said extension and having its axis parallel to said first shaft, an arm angularly movable about the axis of said second shaft, a cross-shaft for applying the brakes on the other side of the vehicle, said cross-shaft being fixed in said arm, movable means for locking said arm to said second pedal, movable means for locking the first and second pedals together for simultaneous operation, and means coupling said locking means for the pedals to said means for locking said arm to the second pedal whereby said arm is permitted to move angularly relative to the second pedal when the pedals are locked together and is locked to said second pedal when the pedals are free.

3. Means as in claim 2 wherein said means for locking the pedals together comprises a member keyed on a spindle rotatably mounted in said second pedal and said means for locking said arm to the second pedal comprises a locking plunger movably mounted on said pedal and co-operating with a recess in said arm, said plunger being coupled by a rod to an eccentric pin on said spindle.

References Cited in the file of this patent

UNITED STATES PATENTS

| | | |
|---|---|---|
| 1,431,029 | Parker | Oct. 3, 1922 |
| 1,523,261 | Goreau | Jan. 13, 1925 |
| 1,893,544 | Furgason | Jan. 10, 1933 |
| 2,476,363 | Foster | July 19, 1949 |
| 2,504,258 | Elenewicz | Apr. 18, 1950 |
| 2,842,239 | Banker | July 8, 1958 |
| 2,894,608 | Wittren | July 14, 1959 |

FOREIGN PATENTS

| | | |
|---|---|---|
| 684,650 | Germany | Dec. 2, 1939 |